US011955761B2

(12) United States Patent
Flaig et al.

(10) Patent No.: US 11,955,761 B2

(45) Date of Patent: Apr. 9, 2024

(54) BEAM SHUTTER, LASER ARRANGEMENT AND OPERATING METHOD FOR A LASER ARRANGEMENT

(71) Applicant: TRUMPF Laser GmbH, Schramberg (DE)

(72) Inventors: Rainer Flaig, Eschbronn (DE); Andreas Enzmann, Villingen-Schwenningen (DE); Florian Jansen, Villingen-Schwenningen (DE)

(73) Assignee: TRUMPF LASER GMBH, Schramberg (DE)

( * ) Notice: Subject to any disclaimer, the term of this patent is extended or adjusted under 35 U.S.C. 154(b) by 175 days.

(21) Appl. No.: 17/521,906

(22) Filed: Nov. 9, 2021

(65) Prior Publication Data

US 2022/0149578 A1 May 12, 2022

(30) Foreign Application Priority Data

Nov. 10, 2020 (DE) ..................... 10 2020 214 094.4

(51) Int. Cl.
*H01S 3/00* (2006.01)

(52) U.S. Cl.
CPC .......... *H01S 3/0007* (2013.01); *H01S 3/0014* (2013.01); *H01S 3/005* (2013.01)

(58) Field of Classification Search
CPC ....... H01S 3/0007; H01S 3/0014; H01S 3/005
See application file for complete search history.

(56) References Cited

U.S. PATENT DOCUMENTS

| | | | |
|---|---|---|---|
| 4,027,953 A | 6/1977 | Jacob | |
| 4,378,492 A * | 3/1983 | Nagashima | A61B 18/20 250/215 |
| 5,596,590 A * | 1/1997 | de Ruyter | G02B 26/04 372/9 |
| 5,991,319 A | 11/1999 | Zamel et al. | |
| 6,762,866 B2 * | 7/2004 | Carra | B23K 26/064 359/220.1 |
| 10,018,830 B1 * | 7/2018 | Woodruff | H01S 3/005 |
| 2002/0018257 A1 * | 2/2002 | Notheis | B23K 26/702 219/121.6 |
| 2003/0197955 A1 * | 10/2003 | Carra | B23K 26/06 359/738 |
| 2008/0317077 A1 * | 12/2008 | Hoving | H04N 9/3129 348/E9.026 |
| 2011/0211243 A1 | 9/2011 | Smits | |

FOREIGN PATENT DOCUMENTS

CA 2389255 A1 12/2002

* cited by examiner

*Primary Examiner* — Kinam Park

(74) *Attorney, Agent, or Firm* — LEYDIG VOIT & MAYERLTD.

(57) ABSTRACT

A beam shutter is for a laser beam. The beam shutter includes: a reflecting optical unit configured to deflect the laser beam; a holding arm, which is capable of being brought into a release position and a shut-off position and on which the reflecting optical unit is held; a sensor circuit with at least one sensor component arranged between the reflecting optical unit and the holding arm; and an evaluation device, which is configured to interact with the sensor circuit, at least in the shut-off position of the holding arm.

16 Claims, 3 Drawing Sheets

12 38, 50 18 22 41 20 24 16 26 34 14 10

BEAM SHUTTER, LASER ARRANGEMENT AND OPERATING METHOD FOR A LASER ARRANGEMENT

CROSS REFERENCE TO RELATED APPLICATIONS

This application claims benefit to German Patent Application No. DE 10 2020 214 094.4, filed on Nov. 10, 2020, which is hereby incorporated by reference herein.

FIELD

The invention relates to a beam shutter for a laser beam. The invention also relates to a laser arrangement with a laser light source for generating a laser beam and with such a beam shutter. The invention relates furthermore to an operating method for such a laser arrangement.

BACKGROUND

In the case of laser arrangements with a laser light source for generating a laser beam, it is often provided that, when a safety circuit is opened (for example a light barrier is interrupted or an enclosure is opened), a reflecting optical unit is swung into the path of rays of the laser beam. The reflecting optical unit then interrupts the path of the laser beam to an exit opening. The laser beam is deflected by the reflecting optical unit and typically impinges on an absorber.

With such devices, it can sometimes happen that the reflecting optical unit comes away from the holding arm or loses its reflective properties. The laser beam may then pierce the holding arm for the reflecting optical unit. This can lead to personal injury and/or property damage.

In order to detect a failure of the reflecting optical unit, it a temperature-sensitive bimetal component may be arranged behind the reflecting optical unit. If the laser beam impinges on the bimetal component, this may lead to the bimetal component being heated, in particular if the laser light source emits long laser pulses or is operating in continuous wave mode. The heating causes a change in shape of the bimetal component. The change in shape may be detected by way of a proximity switch, which then initiates switching off of the laser light source.

In particular when using ultrashort pulse lasers as the laser light source, it is however possible in the event of a defect of the reflecting optical unit for the laser beam to pierce the holding arm without any appreciable heating ("cold"). This is not reliably detectable with temperature-sensitive bimetal components.

SUMMARY

In an embodiment, the present disclosure provides a beam shutter that is for a laser beam. The beam shutter includes: a reflecting optical unit configured to deflect the laser beam; a holding arm, which is capable of being brought into a release position and a shut-off position and on which the reflecting optical unit is held; a sensor circuit with at least one sensor component arranged between the reflecting optical unit and the holding arm; and an evaluation device, which is configured to interact with the sensor circuit, at least in the shut-off position of the holding arm.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
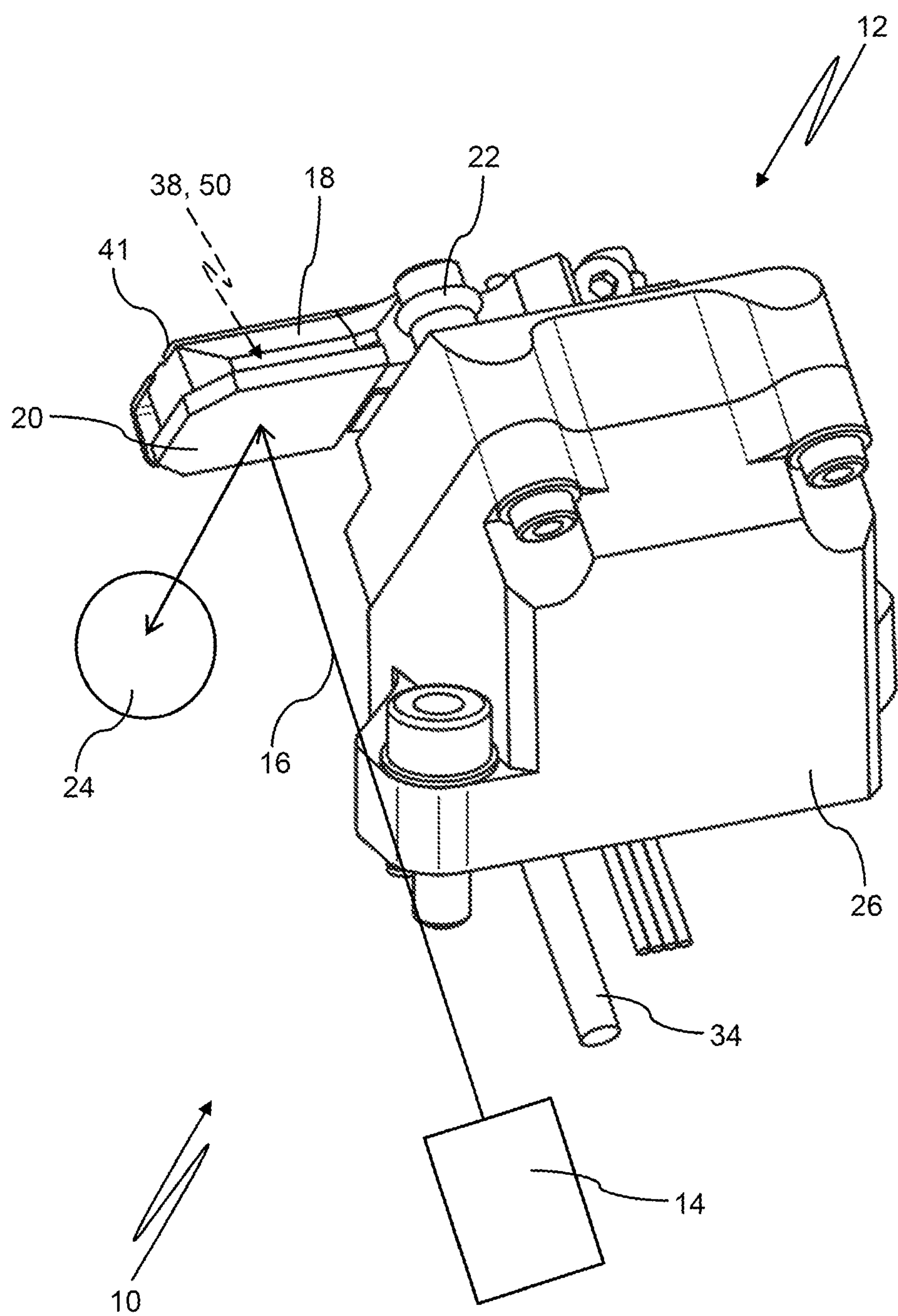
FIG. 1 shows a laser arrangement according to an embodiment of the invention with a beam shutter, and a holding arm with a reflecting optical unit being in a shut-off position, and so a laser beam emitted by a laser light source is deflected onto an absorber.

Embodiments of the present invention improve the operational reliability of laser light sources, in particular to avoid dangers in cases of faults.

Embodiments of the present invention relate to a beam shutter for a laser beam having a reflecting optical unit for deflecting the laser beam and a holding arm, which can be brought into a release position and a shut-off position and on which the reflecting optical unit is held. Embodiments of the present invention also relate to a laser arrangement with a laser light source for generating a laser beam and with such a beam shutter. Embodiments of the present invention relate furthermore to an operating method for such a laser arrangement.

According to an embodiment of the invention, a beam shutter for a laser beam is provided. The beam shutter may also be referred to as a shutter. The beam shutter has a reflecting optical unit for deflecting the laser beam. The reflecting optical unit typically has a reflective coating. In particular, the reflecting optical unit may be a mirror.

Furthermore, the beam shutter has a holding arm. The reflecting optical unit is held on the holding arm. The holding arm can be brought into a release position and a shut-off position. In the shut-off position, the laser beam of a laser arrangement with the beam shutter impinges on the reflecting optical unit and is deflected by it. In the release position, the laser beam passes the beam shutter without being deflected by the reflecting optical unit.

According to an embodiment of the invention, the beam shutter has a sensor circuit with at least one sensor component arranged between the reflecting optical unit and the holding arm. The sensor circuit is an electrical circuit. The sensor component is correspondingly a component of this electrical circuit. In special cases, the sensor circuit may consist of the sensor component.

Furthermore, according to an embodiment of the invention, the beam shutter has an evaluation device. The evaluation device interacts with the sensor circuit, at least in the shut-off position of the holding arm. As a result, a change in the sensor circuit can be detected by the evaluation device. Preferably, the evaluation device may detect at least one characteristic property of the sensor circuit.

Since the sensor component of the sensor circuit is arranged between the reflecting optical unit and the holding arm, in the event of a defect of the reflecting optical unit the laser beam impinges on the sensor component. As a result, a change in the sensor component is brought about. In particular, the sensor component may be destroyed by the laser beam, for example in that the laser beam pierces the sensor component. The change in the sensor component caused by the laser beam leads to a change in the sensor circuit, in particular at least one characteristic property of the sensor circuit. This change in the sensor circuit may in turn be detected by means of the evaluation device. If the evaluation device detects such a change in the sensor circuit, a laser light source may be switched off. A dangerous escape of laser radiation can be avoided in this way.

It may be provided that the evaluation device makes contact with the sensor circuit when the holding arm is in the shut-off position. For this purpose, sliding contacts for example may be provided on the evaluation device and/or on the sensor circuit.

With particular preference, the evaluation device interacts contactlessly with the sensor circuit. This simplifies the structure of the beam shutter. Moreover, then no wear occurs between the evaluation device and the sensor circuit. Furthermore, no moving wires or conductors are required for connecting the evaluation device and the sensor circuit, and so there is no risk of these breaking as a result of material fatigue.

The sensor component or one of the sensor components may be a capacitor, a coil, a conductor path, an radio frequency identification (RFID) chip, a thermistor, a diode, preferably a photodiode, a transistor or a fuse. If a number of sensor components are provided, a number of the sensor components or all of the sensor components may each be one of the aforementioned elements; for example, a first sensor component may be a capacitor and a second sensor component may be a conductor track. For example, a number of identical sensor components, for example two coils, may be provided.

The capacitor is preferably a film capacitor. In tests carried out by the inventors, it has been found that film capacitors react particularly sensitively to being bombarded with laser radiation.

If the sensor component is an RFID chip, it may have an integrated temperature sensor. This makes additional monitoring of the temperature possible. In particular, if the temperature is rising, a laser light source can be switched off already before the laser beam destroys the RFID chip. If no heating takes place—for example when an ultrashort pulse laser is used as the laser light source—the laser light source is in any event switched off if the RFID chip is destroyed.

The evaluation device may interact directly with the sensor component. In this case, the sensor circuit may be formed by the sensor component. For this, the sensor component or sensor circuit may be an RFID chip.

In a preferred embodiment, the sensor circuit has a coupling component for the evaluation device. The evaluation device then interacts with the sensor circuit by way of the coupling component. The coupling component and the sensor component are fundamentally separate parts of the sensor circuit. The coupling component may be a coil. In particular, the evaluation device may be designed to induce a voltage in the coil and/or to detect a magnetic field induced by the coil.

In a particularly preferred embodiment, the coupling component is arranged next to the reflecting optical unit. This facilitates access by the evaluation device to the coupling component. While the sensor component is covered by the reflecting optical unit and the holding arm, the coupling component can be freely accessible from at least one direction. The coupling component and the evaluation device may consequently be positioned close to one another when the holding arm is in the shut-off position. In particular, when the holding arm is brought from the release position into the shut-off position, the coupling component may be pivoted over the evaluation device.

In a particularly preferred embodiment, the sensor circuit has a capacitor as the sensor component and a coil as the coupling component. The capacitor and the coil form an oscillating circuit. Portions of conductor tracks that connect the capacitor and the coil to one another may extend as further sensor components between the reflecting optical unit and the holding arm. If in the event of a defect of the reflecting optical unit the laser beam impinges on the capacitor and/or the portions of the conductor paths, this changes the natural frequency or resonant frequency of the oscillating circuit. After the impingement of the laser beam on the sensor circuit, the natural frequency or resonant frequency at the time no longer corresponds to the original natural frequency or resonant frequency of the oscillating circuit. When the laser beam impinges on the capacitor, in particular its capacitance may be reduced. When the laser beam impinges on the portions of the conductor tracks, they may be charred or burnt through, which increases their electrical resistance.

In a preferred embodiment, the sensor circuit is formed on a circuit board. This makes it easier to provide the sensor circuit. The circuit board extends at least partly between the reflecting optical unit and the holding arm. As a result, the sensor circuit may be at least partially arranged between the reflecting optical unit and the holding arm. In particular, the partial region of the circuit board that carries the sensor component is located between the reflecting optical unit and the holding arm. If the sensor circuit has a coupling component, it is typically arranged in a partial region of the circuit board that is not covered by the reflecting optical unit and/or the holding arm. In particular, the circuit board may protrude laterally beyond the reflecting optical unit.

The evaluation device may have an inductance, in particular an evaluating coil. In particular, if the sensor circuit has a coupling component in the form of a coil (sensor coil), a state of the sensor circuit can be monitored by means of mutual induction.

In a preferred embodiment, the evaluation device is a proximity switch. The proximity switch may have the inductance of the evaluation device. In particular, a change in a resonant frequency of an oscillating circuit of the sensor circuit can be detected by means of the proximity switch. The inductive proximity switch may be tuned to the resonant frequency of the intact oscillating circuit.

It may be provided that a characteristic property of the sensor circuit is reversibly changeable. This makes it possible to check the interaction of the sensor circuit with the evaluation device. For the functional check, the characteristic property is deliberately changed. Then the characteristic property is determined by means of the evaluation device and it is checked whether the evaluation device has detected the change in the characteristic property. After completion of the functional check, the change in the characteristic property is reversed.

A switch may be provided for changing the characteristic property. The switch is preferably a dry-reed switch. With the switch, a conductor track of the sensor circuit can be interrupted or the sensor circuit can be short-circuited. This in each case changes a property of the sensor circuit that can be detected by the evaluation device.

The holding arm may be mounted rotatably on a main body of the beam shutter. A rotary mounting can be of a particularly simple design. The holding arm can therefore be pivoted between the shut-off position and the release position. A rotary actuator, in particular a stepping motor, may be provided for rotating or pivoting the holding arm. In particular, the holding arm may be fastened on a shaft of the rotary actuator. In this way, a beam shutter of a particularly simple structure is obtained.

In a preferred embodiment, the holding arm is prestressed into the shut-off position. This can achieve the effect that the holding arm goes over automatically into the shut-off position or remains in the shut-off position if it is not actively brought into the release position by a drive. This increases safety in the event of a defect or failure of the drive. A spring element may be provided for prestressing the holding arm. The spring element may be articulated on or attached to the holding arm and a main body of the beam shutter.

A stop may be provided for the holding arm. The stop may in particular define the shut-off position or prevent the holding arm from being brought beyond the shut-off position. Together with prestressing, the stop allows the transfer of the holding arm into the shut-off position to be made even safer. As an alternative or in addition, the stop may define the release position or prevent the holding arm from being brought beyond the release position.

Various embodiments of the present invention also include a laser arrangement with a laser light source for generating a laser beam and with a beam shutter according to an embodiment of the present invention as described above. The laser light source may be an ultrashort pulse laser, in particular a picosecond laser (pulse duration of less than 1 nanosecond) or a femtosecond laser (pulse duration of less than one picosecond). Ultrashort pulse lasers make cold working of material, with virtually no heat being introduced into the workpiece, possible even when using moderate to average power outputs (for example 10 to 150 watts).

The laser beam impinges on the reflecting optical unit in the shut-off position of the holding arm. The beam shutter is to this extent arranged in the path of rays of the laser beam. The advantages of the beam shutter according to the invention can be made usable in the case of such a laser arrangement. In particular, in the case of ultrashort pulse lasers it is particularly important to be able to detect a failure of the reflecting element without being reliant on the measurement of a temperature increase, since with ultrashort pulse lasers cold material working is performed. The beam shutter according to the invention is able to do this.

The laser arrangement typically also comprises an absorber onto which the laser beam is deflected by the reflecting optical unit when the holding arm is in the shut-off position.

Various embodiments of the present invention also include a method for operating a laser arrangement according to an embodiment of the invention as described above. The method comprises the steps of:

a) bringing the holding arm into the shut-off position, b) operating the laser light source and determining at least one characteristic property of the sensor circuit by the evaluation device, c) switching off the laser light source when the characteristic property of the sensor circuit lies outside a permissible range.

During operation, the laser light source emits a laser beam. The operation of the laser light source may have begun before step a) is carried out. It is ensured by step a) that the laser beam cannot pass the beam shutter.

While the holding arm is in the shut-off position and the laser light source is emitting the laser beam, at least one characteristic property of the sensor circuit is determined by the evaluation device. In particular, the evaluation device may determine a resonant frequency of an oscillating circuit of the sensor circuit.

If the characteristic property lies outside a predefined permissible range, it can be assumed that the reflecting optical unit is defective. The laser light source is therefore switched off. A setpoint value is known for the characteristic property of the sensor circuit. The setpoint value of the characteristic property may be determined computationally or experimentally on the basis of an intact sensor circuit. The permissible range may specify tolerable deviations from the setpoint value. Such deviations may arise for example on account of production tolerances or environmental influences. It may be provided that the laser light source is switched off if a resonant frequency of an oscillating circuit of the sensor circuit deviates from its setpoint value by at least 10%. The setpoint value of the resonant frequency of the oscillating circuit may for example depend on the capacitance of a capacitor forming the sensor component, the inductance of a coil forming the coupling component and the electrical resistance of conductor tracks connecting the capacitor and the coil.

In step b), the sensor component of the sensor circuit may be destroyed by the laser beam emitted by the laser light source. This is the case in particular whenever the reflecting optical unit is no longer able to deflect the laser beam, and so it impinges on the sensor component. The destruction of the sensor component changes at least one characteristic property of the sensor circuit. The changing of the characteristic property is detected by the evaluation device. In response, the laser light source is switched off.

Further advantages of the invention are evident from the description and the drawing. According to the invention, the features mentioned above and those still to be further presented can be used in each case individually or together in any desired expedient combinations. The embodiments shown and described should not be understood as an exhaustive enumeration, but rather are of exemplary character for outlining the invention.

FIG. 1 shows a laser arrangement 10. The laser arrangement 10 has a beam shutter 12 and a laser light source 14. The laser light source 14 may be an ultrashort pulse laser. The laser light source 14 emits a laser beam 16. The beam shutter 12 has a holding arm 18. The holding arm 18 carries a reflecting optical unit 20. Here, the reflecting optical unit 20 is a mirror. The holding arm 18 with the reflecting optical unit 20 can be brought into a release position and into a shut-off position. In FIG. 1, the holding arm 18 with the reflecting optical unit 20 is in the shut-off position. In the shut-off position, the holding arm 18 may lie against a stop 22. In the shut-off position, the reflecting optical unit 20 is in the path of rays of the laser beam 16. The reflecting optical unit 20 then deflects the laser beam 16. The deflected laser beam 16 impinges on an absorber 24 of the sensor arrangement 10. In the release position, the laser beam 16 can pass the beam shutter 12 without being deflected by the reflecting optical unit 20.

Figure 2:
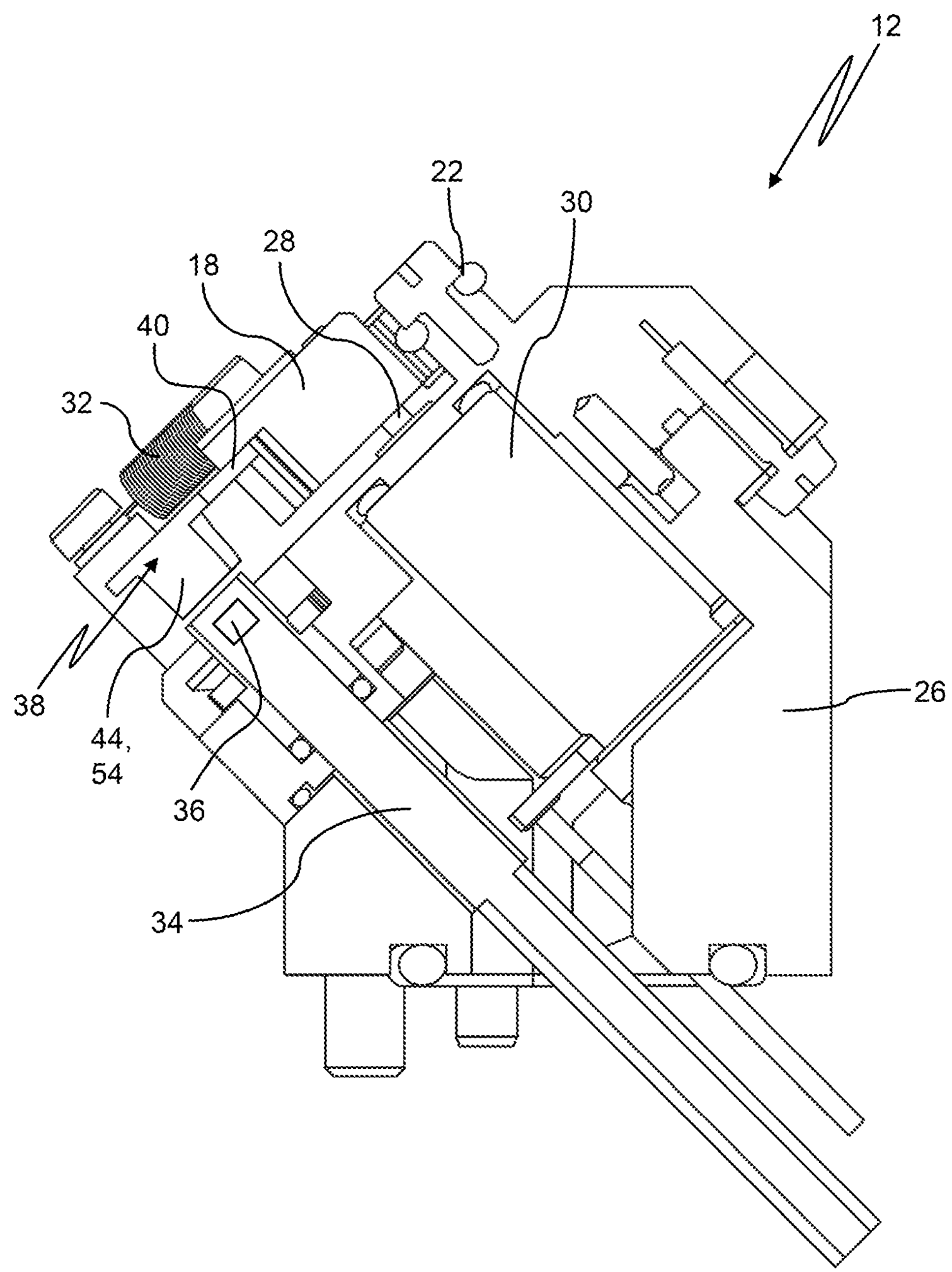
FIG. 2 shows the beam shutter of the sensor arrangement from FIG. 1 in a schematic sectional view, an evaluation device interacting contactlessly with a sensor circuit in order to monitor the functional capability of the reflecting optical unit.

FIG. 2 shows the beam shutter 12 in a sectional view. The holding arm 18 is mounted rotatably on a main body 26 of the beam shutter 12 In the present case, the holding arm 18 is fastened on a shaft 28 of a rotary actuator 30. The rotary actuator 30 serves the purpose of bringing the holding arm 18 with the reflecting optical unit 20 between the release position and the shut-off position. In the present case, the holding arm 18 is prestressed into the shut-off position. A spring element 32 may be provided for this purpose Here, the spring element 32 is fastened on the main body 26 and the holding arm 18.

The beam shutter 12 has an evaluation device 34. The evaluation device 34 serves the purpose of checking the functional capability of the reflecting optical unit 20. The evaluation device 34 may be a proximity switch, preferably an inductive proximity switch. An inductance (evaluation coil) 36 may be arranged at an end of the evaluation device 34 that is facing the holding arm. The evaluation device 34 may have an evaluation logic, which may for example be stored as software in a control device.

Figure 3:
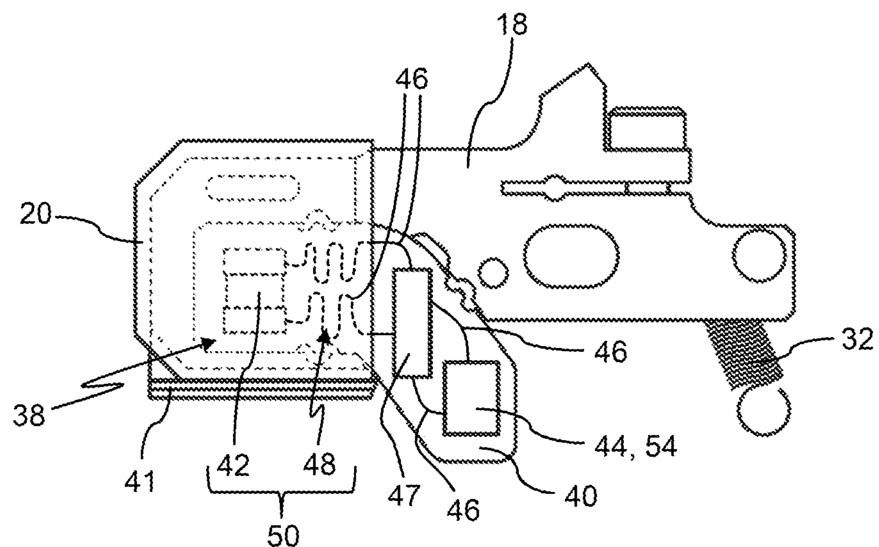
FIG. 3 shows the holding arm of the beam shutter of the laser arrangement from FIG. 1 in a schematic view, it being evident that a circuit board with the sensor circuit extends between the reflecting optical unit and the holding arm.

In order to monitor the functional capability of the reflecting optical unit 20, the evaluation device 34 interacts with a sensor circuit 38, compare FIG. 3, which shows the holding arm 18, the reflecting optical unit 20 and also the sensor circuit 38 with a view of the reflecting optical unit 20. The sensor circuit 38 may be arranged on a circuit board 40.

Seen from the reflecting optical unit 20, behind the holding arm 18 there may be arranged a copper plate 41 (compare FIG. 1). The copper plate 41 is more resistant to laser radiation than the holding arm 18. In particular, the copper plate may have a higher abrasion threshold or a higher abrasion resistance. As a result, a time period until the laser beam 16 has pierced the holding arm 18 and the copper plate 41 in the event of a defect of the reflecting optical unit 20 is extended. In the time period that the laser beam 16 needs to pierce the holding arm 18 and the cover plate 41, the sensor circuit 38 can be evaluated and the laser light source 14 switched off.

Here, the sensor circuit 38 is formed as an electrical oscillating circuit. The evaluation device 34 can establish whether a resonant frequency of the oscillating circuit is in a predefined permissible range. The sensor circuit 38 has a capacitor 42 and a coil 44. The capacitor 42 may be a film capacitor. The capacitor 42 and the coil 44 are connected to one another by way of conductor tracks 46. In the exemplary embodiment represented, the sensor circuit 38 also has a switch 47. The switch 47 may be a dry-reed switch. The switch 47 makes it possible to short-circuit the conductor tracks 46 temporarily in order to change the resonant frequency of the oscillating circuit. In this way it can be checked whether the evaluation device 34 is interacting correctly with the sensor circuit 38.

Figure 4:
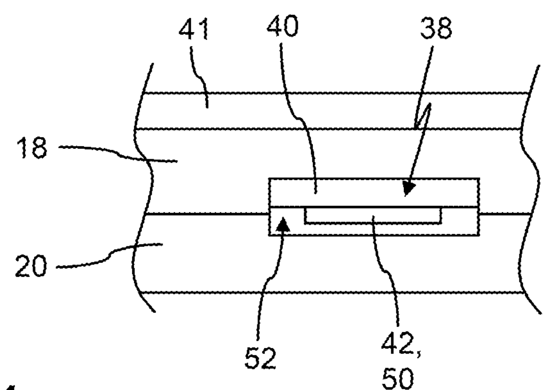
FIG. 4 shows an abstracted cross-sectional view through the holding arm, the reflecting optical unit and the circuit board with the sensor circuit according to the arrangement from FIG. 3.

Here, the capacitor 42 and meandering portions 48 of the conductor tracks 46 form sensor components 50 of the sensor circuit 38. The sensor components 50 are arranged between the reflecting optical unit 20 and the holding arm 18, also compare FIG. 4. The circuit board 40 extends with its partial region carrying the capacitor 42 and the meandering portions 48 of the conductor tracks 46 between the reflecting optical unit 20 and the holding arm 18. The holding arm 18 and/or the reflecting optical unit 20 may have recesses 52 for receiving the sensor components 50 or the circuit board 40. Preferably, the capacitor 42 and the meandering portions 48 are arranged on the circuit board 40 facing the reflecting optical unit 20. If the reflecting optical unit 20 happens to fail and the holding arm 18 is in the shut-off position, during the operation of the laser light source 14 the laser beam 16 impinges on the sensor components 50. As a result, the sensor components 50 are damaged and finally destroyed. This changes at least one characteristic property of the sensor circuit 38, for example the resonant frequency of the oscillating circuit.

This changing of the sensor circuit 38 is detected by the evaluation device 34. For this purpose, the evaluation device 34 may interact contactlessly with the sensor circuit 38, compare in particular FIG. 2. In the shut-off position, the end of the evaluation device 34 that is facing the holding arm 18 is close to the coil 44 of the sensor circuit 38. The coil 44 serves here as a coupling component 54 of the sensor circuit 38. By mutual induction between the inductance 36 of the evaluation device 34 and the coil 44 of the sensor circuit 38, the evaluation device 34 can determine characteristic properties of the sensor circuit 38. In the exemplary embodiment represented, the coil 44 or the coupling component 54 of the sensor circuit 38 is arranged next to the reflecting optical unit 20, compare in particular FIG. 3. In the present case, also the holding arm 18 does not cover the coupling component 54. This makes it easier to bring the evaluation device 34, in particular its inductance 36, right up to the sensor circuit 38, in particular its coupling component 54, compare FIG. 2. This can achieve the effect that the evaluation device 24 and the sensor circuit 38 reliably interact.

Figure 5:
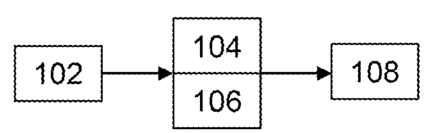
FIG. 5 shows a schematic flow diagram of an operating method according to an embodiment of the invention for a laser arrangement.

FIG. 5 shows a flow diagram for an operating method for a laser arrangement. The operating method is explained here by way of example on the basis of the laser arrangement 10 from FIG. 1.

In a step 102, the holding arm 18 with the reflecting optical unit 20 is brought into the shut-off position. For this purpose, the rotary actuator 30 may pivot the holding arm 18 with respect to the main body 26.

While the holding arm 18 with the reflecting optical unit 20 is in the shut-off position, in a step 104 the laser light source 14 is operated. A laser beam 16 emitted by the laser light source 14 impinges on the reflecting optical unit 20. The operation of the laser light source 14 may have already begun before the step 102 is carried out.

While the laser light source 14 is being operated and the holding arm 18 is in the shut-off position, in a step 106 a characteristic property of the sensor circuit 38 is determined. For example, the evaluation device 34 may determine the resonant frequency of the oscillating circuit of the sensor circuit 38 at regular intervals or continuously.

If the reflecting optical unit 20 is unable to reflect the laser beam 16, i.e. if the reflecting optical unit 20 is defective, the laser beam 16 impinges on the sensor components 50 of the sensor circuit 38. The sensor components 50 may be destroyed as a result. This changes characteristic properties of the sensor circuit 38, for example the resonant frequency of the oscillating circuit. As soon as the evaluation device 34 establishes that a characteristic property of the sensor circuit 38 detected by it lies outside a predefined permissible range, the laser light source 14 is switched off in a step 108.

Embodiments of the present invention relate to a monitored beam shutter 12. When a holding arm 18 with a reflecting optical unit 20 is in a shut-off position, an evaluation device 34 determines at least one characteristic property of a sensor circuit 38. At least one element of the sensor circuit 38 serving as a sensor component 50 is arranged between the reflecting optical unit 20 and the holding arm 18. In the event of a defect of the reflecting optical unit 20, a laser beam 16 therefore impinges on the sensor components 50. This changes properties of the sensor circuit 38. An evaluation device 34 interacts, preferably contactlessly, with the sensor circuit 38. The evaluation device 34 checks whether one or more properties of the sensor circuit 38 lie within a permissible range. If this is not the case, this indicates a defect of the reflecting optical unit 20. The laser light source 14 is therefore switched off.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Laser arrangement 10
Beam shutter 12
Laser light source 14
Laser beam 16
Holding arm 18
Reflecting optical unit 20
Stop 22
Absorber 24
Main body 26
Shaft 28
Rotary actuator 30
Spring element 32
Evaluation device 34
Inductance 36
Sensor circuit 38
Circuit board 40
Copper plate 41
Capacitor 42
Coil 44
Conductor tracks 46
Switch 47
Portions 48 of the conductor tracks 46
Sensor components 50
Recesses 52
Coupling component 54
Bringing 102 the holding arm 18 into the shut-off position
Operating 104 the laser light source 14
Determining 106 a characteristic property of the sensor circuit 38
Switching off 108 the laser light source 14

The invention claimed is:

1. A beam shutter for a laser beam, the beam shutter comprising:

a reflecting optical unit configured to deflect the laser beam;

a holding arm, which is capable of being brought into a release position and a shut-off position and on which the reflecting optical unit is held;

a sensor circuit with at least one sensor component arranged between the reflecting optical unit and the holding arm; and an evaluation device, which is configured to interact with the sensor circuit, at least in the shut-off position of the holding arm.

2. The beam shutter according to claim 1, wherein the evaluation device is configured to interact contactlessly with the sensor circuit.

3. The beam shutter according to claim 1, wherein the at least one sensor component comprises a capacitor, a coil, a conductor track, an radio frequency identification chip, a thermistor, a diode, a transistor, or a fuse.

4. The beam shutter according to claim 1, wherein the sensor circuit has a coupling component for the evaluation device.

5. The beam shutter according to claim 4, wherein the coupling component is arranged next to the reflecting optical unit.

6. The beam shutter according to claim 1, wherein the sensor circuit is formed on a circuit board, which extends between the reflecting optical unit and the holding arm.

7. The beam shutter according to claim 1, wherein the evaluation device has an inductance.

8. The beam shutter according to claim 1, wherein the evaluation device is a proximity switch.

9. The beam shutter according to claim 1, wherein a characteristic property of the sensor circuit is reversibly changeable.

10. The beam shutter according to claim 9, wherein a switch, is provided for changing the characteristic property of the sensor circuit.

11. The beam shutter according to claim 1, wherein the holding arm is mounted rotatably on a main body.

12. The beam shutter according to claim 1, wherein the holding arm is prestressed into the shut-off position.

13. A laser arrangement comprising a laser light source for generating the laser beam and the beam shutter according to claim 1, the laser beam configured to impinge on the reflecting optical unit in the shut-off position of the holding arm.

14. A method for operating a laser arrangement, the method comprising:

generating a laser beam using a laser light source of the laser arrangement;

operating a beam shutter of the laser arrangement, the beam shutter comprising: a reflecting optical unit configured to deflect the laser beam; a holding arm which is capable of being brought into a release position and a shut-off position and on which the reflecting optical unit is held; a sensor circuit with at least one sensor component arranged between the reflecting optical unit and the holding arm; and an evaluation device that is configured to interact with the sensor circuit, at least in the shut-off position of the holding arm, wherein operating the beam shutter comprises bringing the holding arm into the shut-off position;

determining at least one characteristic property of the sensor circuit by the evaluation device; and switching off the laser light source upon the characteristic property of the sensor circuit being determined to lie outside a permissible range.

15. The method according to claim 14, wherein the sensor circuit comprises an electrical oscillating circuit, and the characteristic property of the sensor circuit comprises a resonant frequency of the electrical oscillating circuit, and wherein the resonant frequency changes as a result of the sensor component of the sensor circuit being destroyed by the laser beam emitted by the laser light source.

16. The beam shutter according to claim 1, wherein the sensor circuit comprises an electrical oscillating circuit, wherein the evaluation device is configured to detect a failure of the reflecting optical unit by detecting a change of a resonant frequency of the electrical oscillating circuit as a result of a damage to the sensor component by the laser beam.

* * * * *